US009083545B2

(12) United States Patent
Jung et al.

(10) Patent No.: US 9,083,545 B2
(45) Date of Patent: Jul. 14, 2015

(54) METHOD AND APPARATUS FOR MANAGING RESOURCES OF A UNIVERSAL PLUG AND PLAY DEVICE BASED ON A CONNECTION STATUS OF A CONTROL POINT

(75) Inventors: Dong-shin Jung, Suwon-si (KR); Joo-yeol Lee, Seoul (KR); Kiran Bharadwaj Vedula, Bangalore (IN); Subramanian Krishnamoorthy, Bangalore (IN); Sreekanth Siddapur Channakeshava, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1717 days.

(21) Appl. No.: 12/143,946

(22) Filed: Jun. 23, 2008

(65) Prior Publication Data

US 2008/0320177 A1 Dec. 25, 2008

Related U.S. Application Data

(60) Provisional application No. 60/945,702, filed on Jun. 22, 2007.

(30) Foreign Application Priority Data

Feb. 26, 2008 (KR) ........................ 10-2008-0017411

(51) Int. Cl.

*H04L 12/28* (2006.01)
*G06F 1/32* (2006.01)
*H04L 12/24* (2006.01)

(52) U.S. Cl.

CPC .......... *H04L 12/2809* (2013.01); *G06F 1/3209* (2013.01); *H04L 12/24* (2013.01); *H04L 41/00* (2013.01); *H04L 41/0809* (2013.01);

(Continued)

(58) Field of Classification Search

None

See application file for complete search history.

(56) References Cited

U.S. PATENT DOCUMENTS

| | | | | |
|---|---|---|---|---|
| 7,693,934 | B2 * | 4/2010 | Jung et al. | 709/203 |
| 2003/0101294 | A1 * | 5/2003 | Saint-Hilaire et al. | 710/11 |
| 2004/0030793 | A1 * | 2/2004 | Noda et al. | 709/230 |

(Continued)

FOREIGN PATENT DOCUMENTS

| | | | |
|---|---|---|---|
| CN | 1949711 | A | 4/2007 |
| EP | 1775915 | A2 | 4/2007 |
| WO | 2004039005 | A1 | 5/2004 |

OTHER PUBLICATIONS

UPnP Forum, "UPnP Device Architecture 1.0", Ver. 1.0.1, Dec. 2, 2003, pp. 1-76.*

(Continued)

*Primary Examiner* — Idriss Alrobaye
*Assistant Examiner* — Dayton Lewis-Taylor
(74) *Attorney, Agent, or Firm* — Sughrue Mion, PLLC

(57) ABSTRACT

Provided are a method and apparatus for managing resources of a Universal Plug and Play (UPnP) device based on a connection status of a control point. The method of managing resources of a controlled device includes: monitoring an invocation of an action representing a connection of a control point for a predetermined time; determining whether the control point is connected to the controlled device or not by considering whether the monitored action is invoked or not; and increasing available resources by selectively deactivating an application which is controlled by the control point according to the determination result. Accordingly, the resources of the UPnP device can be effectively managed.

18 Claims, 8 Drawing Sheets

(52) U.S. Cl.
CPC ......... *H04L41/0266* (2013.01); *H04L 41/0273* (2013.01); *H04L 41/12* (2013.01)

(56) References Cited

U.S. PATENT DOCUMENTS

| | | | | |
|---|---|---|---|---|
| 2005/0108331 | A1* | 5/2005 | Osterman | 709/205 |
| 2005/0208983 | A1* | 9/2005 | Khoo | 455/575.1 |
| 2005/0240699 | A1* | 10/2005 | Yoder et al. | 710/200 |
| 2005/0255870 | A1* | 11/2005 | Chang et al. | 455/502 |
| 2005/0286427 | A1* | 12/2005 | Hutter | 370/241 |
| 2006/0031888 | A1 | 2/2006 | Sparrell | |
| 2006/0072477 | A1* | 4/2006 | Bodlaender | 370/254 |
| 2006/0094402 | A1* | 5/2006 | Kim | 455/411 |
| 2006/0155802 | A1 | 7/2006 | He et al. | |
| 2007/0124725 | A1* | 5/2007 | Wang et al. | 717/114 |

OTHER PUBLICATIONS

Microsoft Corporation, "White Paper: Understanding Universal Plug and Play", Copyright 2000, pp. 1-45.*

Ritchie, John et al., "UPnP AV Architecture: 1", Ver. 1.00, Jun. 25, 2002, Contributing Members of the UPnP Forum, pp. 1-22.*

Thomson, "Thomson Gateways and UPnP", Ver. 3.0, Apr. 2007, Thomson, pp. 1-22.*

Woodings, Ryan et al., "Rapid Heterogeneous Connection Establishment: Accelerating Bluetooth Inquiry Using IrDA", Brigham Young University, Jan. 22, 2001, pp. 1-15.*

"UPnP Device Architecture 1.0", UPnP Forum, revision date Jul. 20, 2006, 11 pages.

Communication from the Chinse Patent Office, dated Nov. 24, 2011, issued in counterpart Chinese Application No. 200880103922.8.

Communication, dated Mar. 11, 2013, issued by the European Patent Office in counterpart European Patent Application No. 08766389.4.

Communication dated Aug. 31, 2012, issued by the State Intellectual Property Office of the People's Republic of China in counterpart Chinese Application No. 200880103922.8.

Communication dated Dec. 12, 2012, issued by the State Intellectual Property Office of the P.R.C. in counterpart Chinese Application No. 200880103922.8.

Communication issued on Feb. 7, 2012 by the European Patent Office in the counterpart European Patent Application No. 08766389.4.

Communication from the European Patent Office issued May 6, 2014 in a counterpart European Application No. 08766389.4.

Communication dated Apr. 22, 2014 from the Korean Intellectual Property Office in a counterpart Korean application No. 10-2008-0017411.

Communication, dated Jan. 28, 2014, issued by the State Intellectual Property Office of P.R. China in counterpart Chinese Patent Application No. 200880103922.8.

* cited by examiner

METHOD AND APPARATUS FOR MANAGING RESOURCES OF A UNIVERSAL PLUG AND PLAY DEVICE BASED ON A CONNECTION STATUS OF A CONTROL POINT

CROSS-REFERENCE TO RELATED PATENT APPLICATION

This application claims priority from U.S. Provisional Application No. 60/945,702, filed on Jun. 22, 2007 in the U.S. Patent and Trademark Office, and Korean Patent Application No. 10-2008-0017411, filed on Feb. 26, 2008 in the Korean Intellectual Property Office, the disclosures of which are incorporated herein in their entirety by reference.

BACKGROUND

1. Field

Methods and apparatuses consistent with the present invention relate to a home network, and more particularly, to managing resources of a Universal Plug and Play (UPnP) device in a UPnP network.

2. Description of the Related Art

Home networks provide an easy and convenient method for services and apparatuses, such as electrical appliances for providing information, wireless communication apparatuses, and PC related apparatuses which are scattered in various places, to communicate with each other. A UPnP device is one example of the various kinds of middleware for providing a home network. A UPnP device provides communication means for easily connecting various devices by using a standardized method that does not require operation by a manager or a user in a network environment such as at home or in a small office. It also provides means for allowing a user to use a service of a device connected through a network. In other words, regarding devices connected to a UPnP network, a device can notify another device about its functions and services, and allow the other device to control those functions and services. Also, when the functions and services are not in use, the devices can be easily removed from the UPnP network.

In the UPnP environment, the devices connected to the UPnP network can be classified as a control device (hereinafter referred to as a "control point"), which controls another device, and a controlled device (also referred to as a UPnP device), which is controlled by the control point. The UPnP network is a Transmission Control Protocol/Internet Protocol (TCP/IP) based network, and thus uses a conventional TCP/IP communication protocol. Accordingly, when a UPnP device connects to the UPnP network for the first time, the UPnP device is assigned an IP address. Then, a user has to perform a discovery process to control the controlled device connected to the UPnP network by using the control point. Next, if the controlled device is discovered, the user has to determine which services are executable in the controlled device. The controlled device generates its description in order to obtain the executable service information, and provides the generated description to the control point. Then, the control point transmits an appropriate command to the controlled device with reference to the description so as to control the controlled device. Here, the command for controlling the controlled device is called an "action" and allows the controlled device to execute a certain service corresponding to the action.

SUMMARY

The present invention provides a method, medium, and apparatus for managing a resource of a UPnP device, which is used to solve the problems in which the UPnP device, controlled by a control point, cannot determine whether the control point is connected to a network or not, and in which a resource of the UPnP device is wasted due to an application corresponding to the control point being preserved even when the control point does not exist in the network.

According to an aspect of the present invention, there is provided a method of managing resources of a controlled device, the method including: monitoring an invocation of an action representing a connection of a control point for a predetermined time; determining whether the control point is connected to the controlled device or not by considering whether the action is invoked or not; and increasing available resources by selectively deactivating an application which is controlled by the control point according to a result of the determining.

According to another aspect of the present invention, there is provided a method of managing resources of a controlled device, the method including: receiving an advertisement message representing a connection status of a control point; determining whether the control point is connected to the controlled device or not in consideration of the type of received advertisement message; and increasing available resources by selectively deactivating an application which is controlled by the control point according to a result of the determining.

According to an aspect of the present invention, there is provided a method of representing a connection of a control point, the method including: invoking an action for checking the connection of the control point to a controlled device at predetermined times; and invoking an action representing that the connection is selectively terminated according to whether the connection is maintained or not.

According to another aspect of the present invention, there is provided a method of representing a connection of a control point, the method including: multicasting a message to the network, representing that a control point is connected to a network; and selectively multicasting a message to the network, representing that the connection is terminated according to whether the connection is maintained or not, after a predetermined time has elapsed.

According to other aspects of the present invention, there is provided a computer readable recording medium having recorded thereon a program for executing the above-described method of managing the resources of the controlled device and the above-described method of representing the connection of the control point.

According to an aspect of the present invention, there is provided an apparatus for managing resources of a controlled device comprising: a control unit monitoring an invocation of an action representing a connection of a control point for a predetermined time; a determination unit determining whether the control point is connected to the controlled device or not by considering whether the action is invoked or not; and a resource management unit increasing available resources by selectively deactivating an application which is controlled by the control point according to a result of the determining.

According to another aspect of the present invention, there is provided an apparatus for managing resources of a controlled device including: a communication unit receiving an advertisement message representing a connection status of a control point; a determination unit determining whether the control point is connected to the controlled device or not in consideration of the type of received advertisement message; and a resource management unit increasing available resources by selectively deactivating an application which is controlled by the control point according to a result of the determining.

According to another aspect of the present invention, there is provided an apparatus for representing resources of a connection of a control point, including a communication unit invoking an action representing the connection of the control point to a controlled device at predetermined times, and invoking an action representing that the connection is selectively terminated according to whether the connection is maintained or not.

According to an aspect of the present invention, there is provided an apparatus for representing resources of a connection of a control point, including a communication unit multicasting a message to the network, representing that a control point is connected to a network, and selectively multicasting a message to the network, representing that the connection is terminated according to whether the connection is maintained or not, after a predetermined time has elapsed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown. The following exemplary embodiments are described assuming that a middleware platform realizing a home network is a UPnP based platform, but it will be obvious to one of ordinary skill in the art that various home network middleware platforms can be applied.

Figure 1:
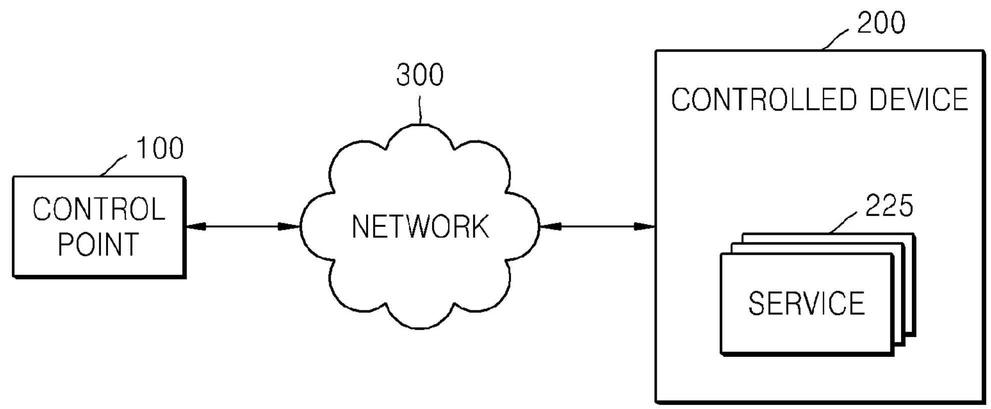
FIG. 1 is a diagram illustrating an environment in which exemplary embodiments of the present invention may be realized.

FIG. 1 is a diagram illustrating an environment in which exemplary embodiments of the present invention are realized. Referring to FIG. 1, the environment includes at least one control point 100 and at least one controlled device 200. For convenience of description, one control point 100 and one controlled device 200 are illustrated. A network 300 connects the control point 100 and the controlled devices 200. Here, assuming that the control point 100 and the controlled device 200 are realized in a UPnP environment, the network 300 may be a UPnP network, and it will be obvious to one of ordinary skill in the art that the UPnP network complies with a standard TCP/IP based communication protocol.

Under the UPnP environment, the network 300 may include a Dynamic Host Configuration Protocol (DHCP) server, and the control point 100 and the controlled device 200 may be assigned with IP addresses via the DHCP server when they are initially connected to the network 300. Here, devices assigned with IP addresses, namely, the control point 100 and the controlled device 200 are all DHCP clients. Then, as described above, when the control point 100 discovers the controlled device 200 connected to the network 300 and receives a detailed description about a device and service from the controlled device 200, preparation for controlling the controlled device 200 is finished. Here, the control point 100 invokes an action for executing a certain service 225 of the controlled device 200 so as to control the controlled device 200. Under the UPnP environment, such an action is represented using Extensible Markup Language (XML) and can be transmitted using a communication standard called the Simple Object Access Protocol (SOAP).

Figure 2A:
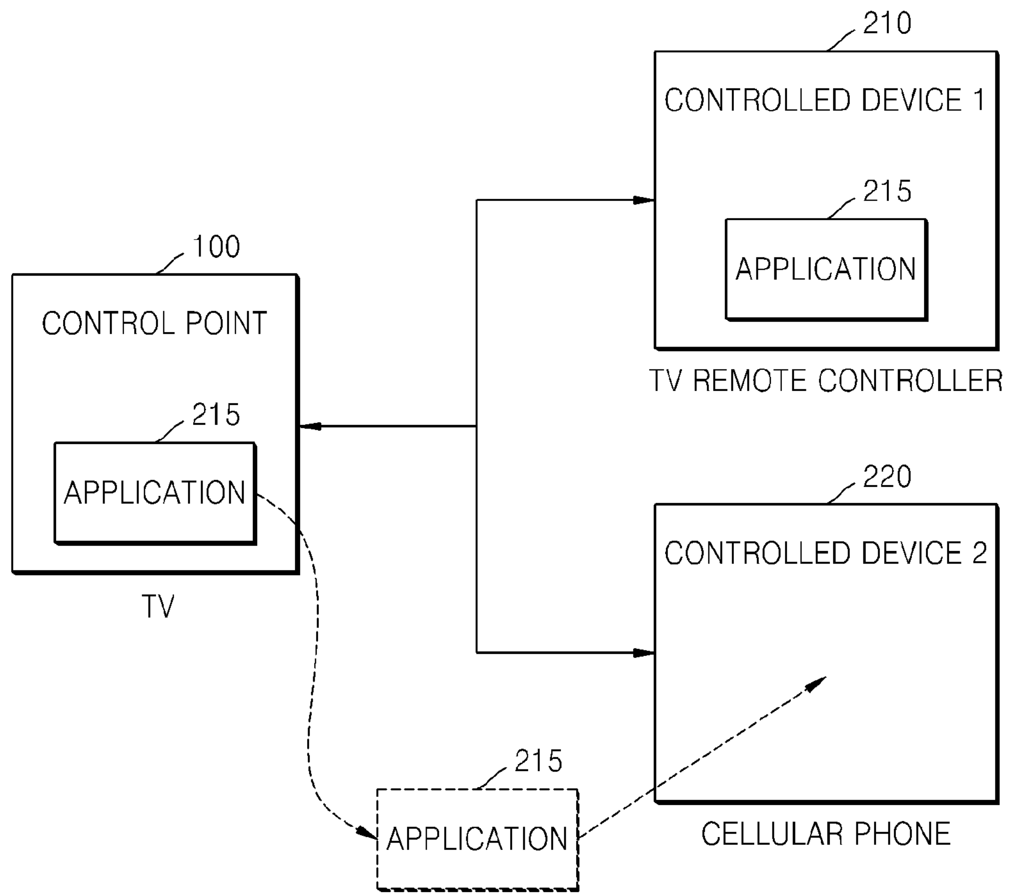
FIG. 2A is a diagram illustrating a situation for establishing an application that provides a new service in an environment in which various exemplary embodiments of the present invention may be realized.

FIG. 2A is a diagram illustrating a situation for establishing an application that provides a new service in an environment in which various exemplary embodiments of the present invention are realized. FIG. 2A assumes that one control point 100 and two controlled devices 210 and 220 exist in a network (not shown). Here, the control point 100 is a TV in which an application 215 controlling the TV is established, a controlled device 1 210 is a TV remote controller in which the application 215 controlling the TV is established, and a controlled device 2 220 is a cellular phone in which there are no applications related to the TV established.

Here, the application may be a command set, a communication protocol, or software for providing a certain service. Such an application can be provided as firmware or an application program for controlling existing hardware. It will be obvious to one of ordinary skill in the art that a Device Control Protocol (DCP) controlling the controlled device can be used as the application in a UPnP environment. Examples of a standard DCP provided by a UPnP forum may be an Internet Gateway Device (IGD), a Media Server & Media Renderer, a Printer Device & Print Basic Service, a heat ventilation and air conditioning (HVAC), a Security Device and Wireless LAN (WLAN) Access Points (AP's), and the like.

As described in FIG. 2A, the application 215 is commonly established in both the control point 100 operating as a TV and the controlled device 1 210 operating as a TV remote controller. Accordingly, the controlled device 1 210 can control the control point 100 by interacting with the control point 100 so as to, for example, turn on the TV and change channels. On the other hand, since there are no applications for controlling the TV established in the controlled device 2 220 operating as a cellular phone, it is impossible for the controlled device 2 220 to control the control point 100. However, if the controlled device 2 220 includes hardware (for example, an infrared transmitting/receiving unit) which can operate at least as a TV remote controller and includes the application 215 for controlling the TV, the controlled device 2 220 can function as the TV remote controller, similar to the controlled device 1 210. In other words, the function of a cellular phone is extended so that the cellular phone can operate as a TV remote controller.

On the other hand, in FIG. 2A, it may appear that the fact that the controlled devices 210 and 220 control the control point 100, and the fact that a control point controls controlled devices in an original UPnP environment, are contrary to each other. However, the former means the controlled devices 210 and 220 use the functions of the TV, that is, the control point 100 by using the application 215, and on the other hand, and the latter means that the control point manages the controlled devices of the network in a UPnP environment, and accordingly, both are different from each other. Thus, as a matter of course, the control point 100 of FIG. 2A manages the connection of the controlled devices 210 and 220.

Figure 2B:
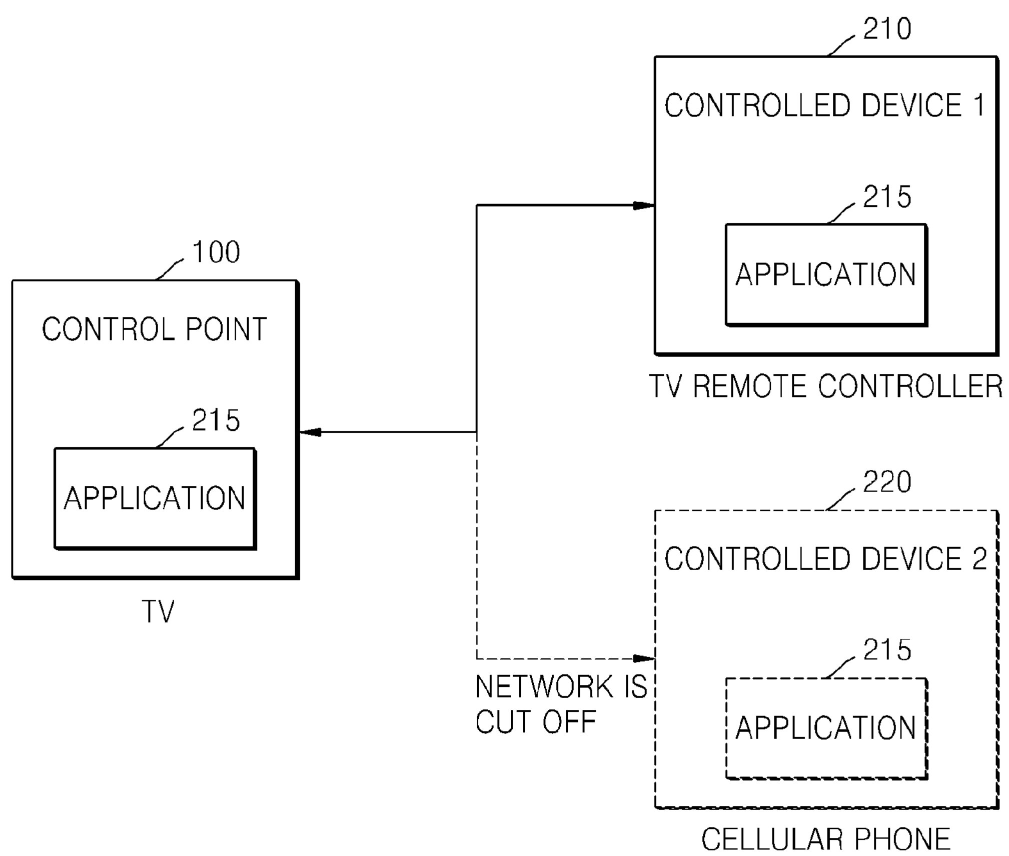
FIG. 2B is a diagram illustrating a problematic situation that is to be solved by various exemplary embodiments of the present invention.

FIG. 2B is a diagram illustrating a problematic situation that is to be solved by various exemplary embodiments of the present invention. In FIG. 2B, an application 215 is established in a controlled device 2 220 in the same environment as that of FIG. 2A. In this case, a user is going to go outside with a cellular phone (the controlled device 2 220) while he or she is using the controlled device 2 220 as a TV remote controller at home. When the user goes outside, the controlled device 2 220 is separated from a network established in the house. Accordingly, the controlled device 2 220 can no longer interact with the control point 100. As described above, the application 215 established in the controlled device 2 220 is a means for the control point 100 to control the controlled device 2 220, and thus the application 215 established in the controlled device 2 220 cannot be used without the control point 100.

However, the problem is that the controlled device 2 220 cannot determine whether the controlled device 2 220 and the control point 100 are connected to each other through a network or not. In other words, despite the controlled device 2 220 and the control point 100 being separated from each other in the network so as not to interact with each other, the controlled device 2 220 may be in a state waiting for an action of the control point 100. In particular, if various applications 215 are established in the controlled devices 210 and 220, and then the controlled devices 210 and 220 are separated from the network, an additional problem is that the applications 215 unnecessarily occupy memory space of the controlled devices 210 and 220, thereby causing deterioration of the performance of the controlled devices 210 and 220.

Accordingly, in order to solve the above problems, the following various exemplary embodiments provide methods for improving a performance of a controlled device by checking whether the controlled device and a control point are connected to each other and deactivating unnecessary applications when the connection between the controlled device and the control point is terminated.

Figure 3:
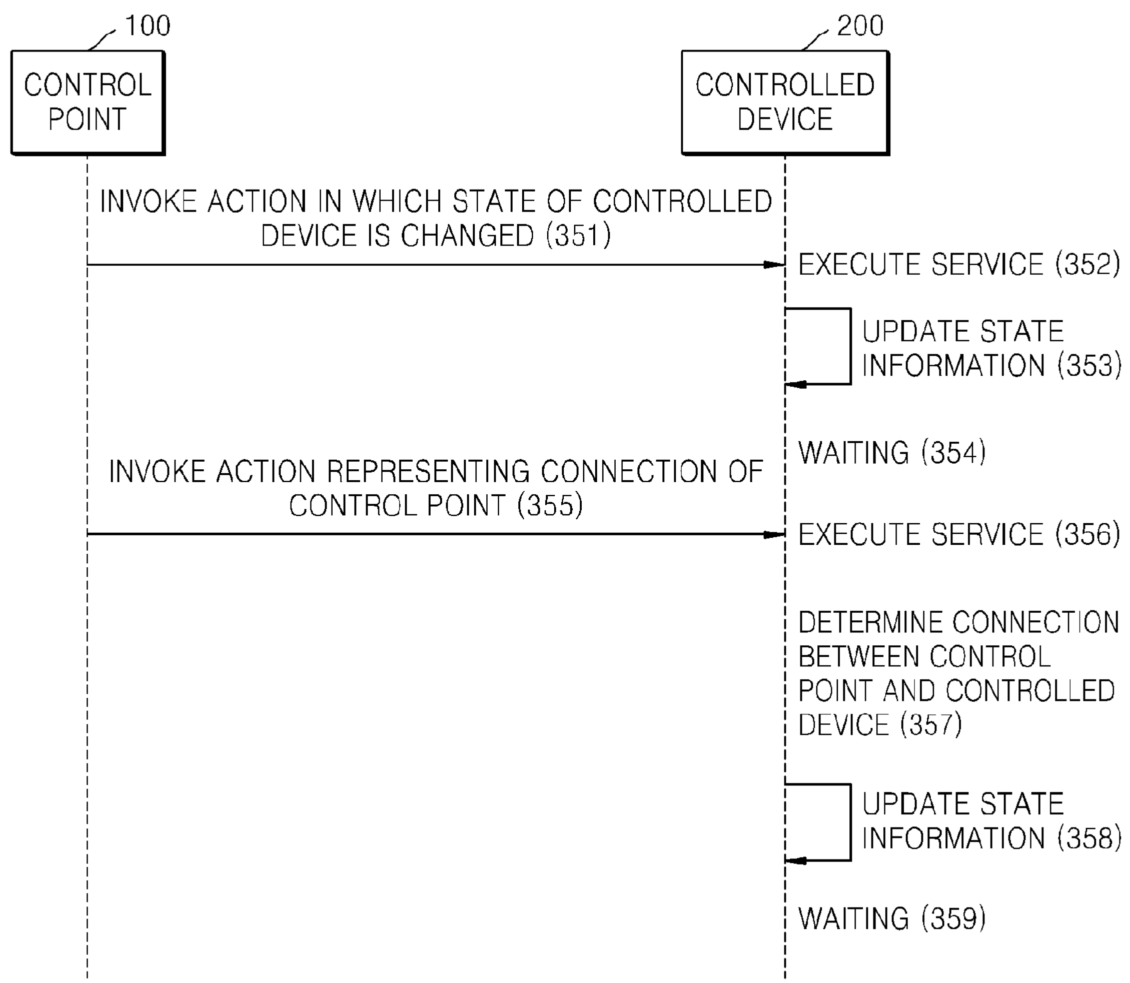
FIG. 3 is a diagram for describing a method of managing a resource of a controlled device by invoking an action according to an exemplary embodiment of the present invention.

FIG. 3 is a diagram for describing a method of managing a resource of a controlled device by invoking an action according to an exemplary embodiment of the present invention. In FIG. 3, one control point 100 and one controlled device 200 are connected to each other.

In operation 351, the control point 100 invokes an action in which a state of the controlled device 200 is changed. Such an action is a command message for executing a certain service of the controlled device 200 in operation 352. If the service has been executed in operation 352, information of an application corresponding to the execution of the service is updated in operation 353. In operation 353, the information of the application may be an identifier of the application, an identifier of the control point 100 corresponding to the application, state information of the application, and the like. The state information of the application may consist of information for managing a lifecycle of the application, for example, managing whether the application is being operated, whether the application is waiting after the operation is finished, whether the application has been stopped, or the like.

Since one or more control points 100 for controlling the controlled device 200 may exist in a network, a plurality of pieces of application information as described above may be included in the controlled device 200. Accordingly, the plurality of application information pieces may be combined so as to form an information map. The information map can establish and manage a database of the application information pieces which become a target of the management. If the information map is used, the related information can be updated in operation 353 by finding application information corresponding to the service executed in operation 352.

Now, an action representing a connection or non-connection between the controlled device 200 and the control point 100 will be defined. The action is a specific action introduced in order to solve a problem in which the controlled device 200 cannot recognize whether the control point 100 is connected to the controlled device 200 or not, as described in FIG. 2B.

In operation 354, the control point 100 waits a predetermined time for an action representing the connection or non-connection of the control point 100. Here, to wait for the action means to monitor invocation of the action. Also the predetermined time, which can vary according to an environment in which exemplary embodiments of the present invention are embodied, means a threshold time during which it is considered that the connection between the control point 100 and the controlled device 200 is maintained. For example, if the predetermined time is 10 minutes, it means that the connection between the control point 100 and the controlled device 200 is maintained for 10 minutes even though they are not communicating with each other. Accordingly, if more than 10 minutes have elapsed, and the control point 100 and the controlled device 200 are not communicating with each other, it is determined that the connection between them has been terminated. That is, the predetermined time functions as a kind of timer.

In operation 355, the control point 100 invokes an action representing a connection or non-connection of the control point 100, within a predetermined time. The action is a command message for executing a service for determining the connection or non-connection of the control point 100 by using a specific identifier of the control point 100 inputted as a parameter. For example, a function "controllerAlive(ContolPoint_ID)" can be invoked as an action representing the connection between the control point 100 and the controlled device 200, and a function "controllerDisconnect(ContolPoint_ID)" can be invoked as an action representing the non-connection between the control point 100 and the controlled device 200. Also, it will be obvious to one of ordinary skill in the art that such actions are processed as XML and can be transmitted using an SOAP.

Next, in operation 356, the controlled device 200 executes a service for determining the connection or non-connection of the control point 100, according to the actions. Here, the service for determining the connection or non-connection of the control point 100 means a service for determining the connection or non-connection between the control point 100 and the controlled device 200 in consideration of the type of action. As a result of the execution of the service, if it is determined that the control point 100 is connected to the controlled device 200 in operation 357, information of an application corresponding to the service is updated in operation 358. In other words, a parameter regarding a lifecycle of the application can be reset, and this process can be performed in a similar manner to operation 353. This is followed by operation 359, in which the control point 100 waits a predetermined time for an action representing the connection or non-connection of the control point 100, in a similar manner to operation 354.

In operation 357, if it is determined that the connection between the control point 100 and the controlled device 200 is being maintained, the controlled device 200 waits for (monitors) an action, for representing the connection or non-connection of the control point 100, to be invoked for a predetermined time. As long as the connection between the control point 100 and the controlled device 200 is maintained, this process is continuously repeated.

Figure 4:
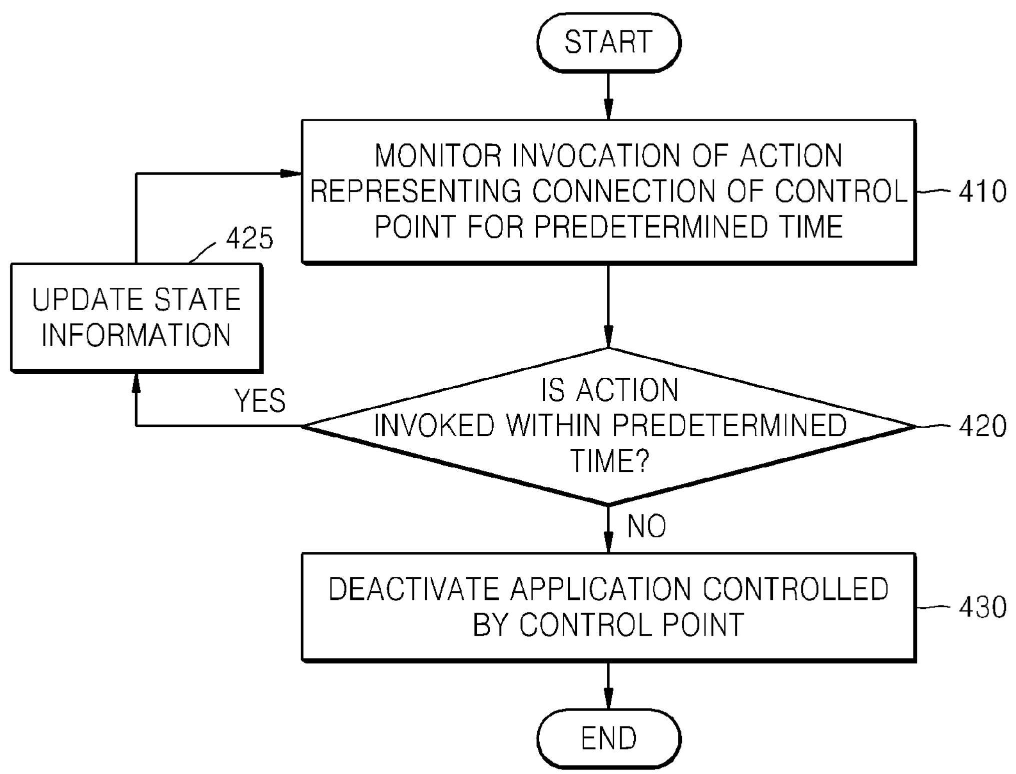
FIG. 4 is a flowchart illustrating processes for managing a resource of a controlled device by invoking an action according to an exemplary embodiment of the present invention.

FIG. 4 is a flowchart illustrating processes for managing a resource of a controlled device by invoking an action according to an exemplary embodiment of the present invention, and exemplifies a process which is performed on the controlled device 200.

In operation 410, an invocation of an action, for representing a connection or non-connection of a control point for a predetermined time, is monitored. Operation 410 corresponds to operation 354 of FIG. 3, and the action also means a command message for executing a service for determining whether a connection between the control point and the controlled device is maintained or terminated.

In operation 420, it is determined whether the action is invoked within a predetermined time. If the action is invoked within the predetermined time and the action is an action representing that the connection of the control point is being maintained, operation 425 is performed, if not, operation 430 is performed.

In operation 425, information of an application corresponding to a service is updated. Operation 425 corresponds to operation 358 of FIG. 3. If the information of the application has been updated, a new waiting process is restarted, and thus, the process returns to operation 410. In other words, an invocation of an action restarts the waiting period. If the connection between the control point and the controlled device is continuously maintained, a process in which operation 410, operation 420, and operation 425 are sequentially performed, and may be repeated.

In operation 430, when an action is not invoked within a predetermined time or the invoked action represents a non-connection between the control point and the controlled device, an application controlled by a control point is deactivated. The application may be software or a protocol established in a controlled device in correspondence with the control point. Here, to deactivate the application means to remove the application, to unload the application from a memory in order to store the application in a temporary storage space such as a cache, or to stop the application from being stored in the memory. In other words, the deactivation is performed in order to prevent an unnecessary waste of resources from occurring due to an application in a controlled device. Such a deactivation can be realized by various methods according to a physical environment or the terms by which exemplary embodiments of the present invention are implemented. For example, if the application will definitely not be used again, the application can be completely removed from the controlled device. On the other hand, if the application is not used for the present but the possibility that the application will be used again is high, the application can be moved from a main memory of the controlled device to a temporary storage space.

In FIGS. 3 and 4, a method for managing a connection status of a control point by invoking an action has been described. According to the current exemplary embodiments, a controlled device continuously represents a connection or non-connection of a control point so as to recognize that the connection between the controlled device and the control point is being maintained. When the control point no longer exists in a network, an application corresponding to the control point is deactivated so as to effectively manage resources of the controlled device.

Figure 5:
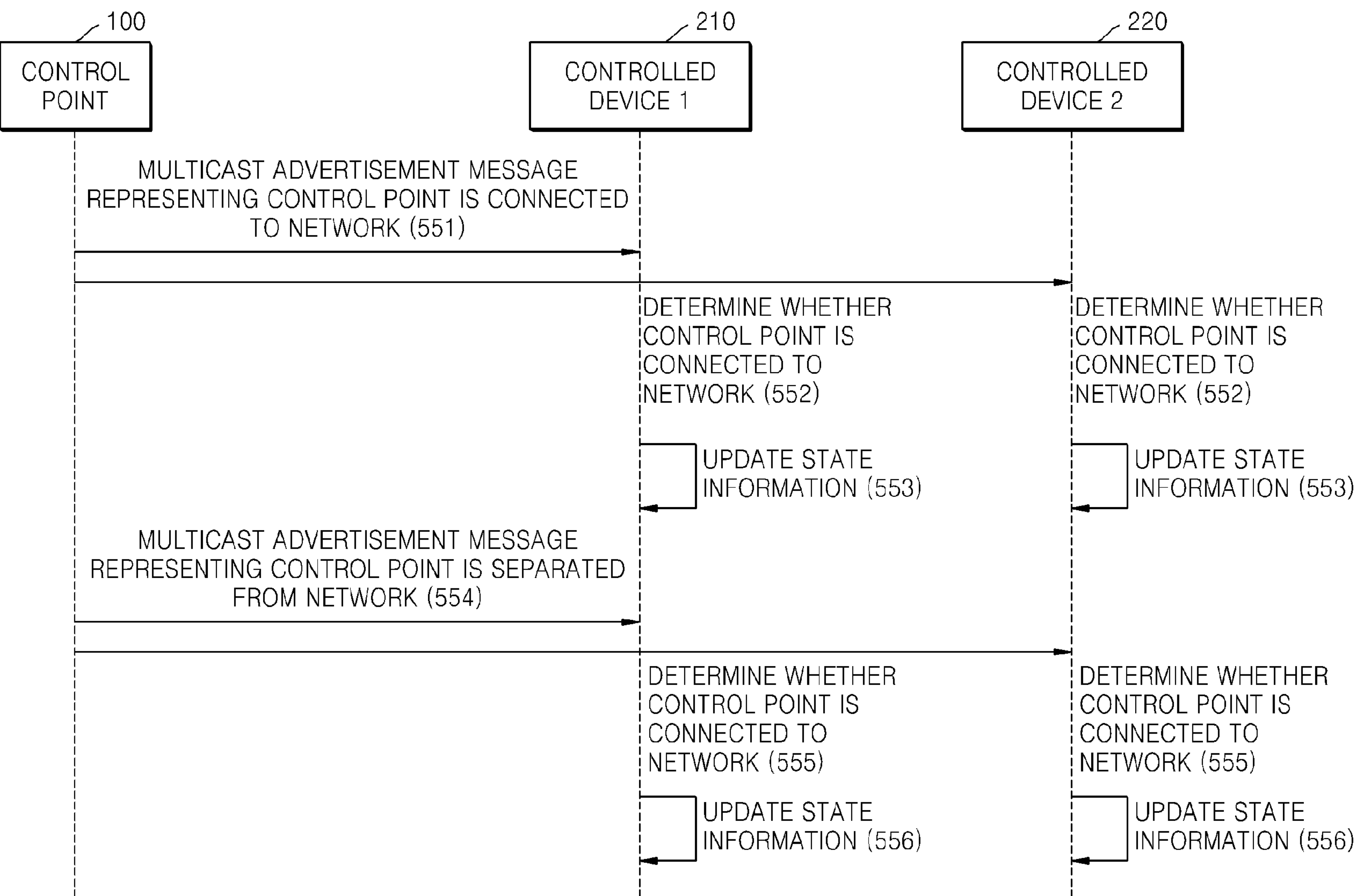
FIG. 5 is a diagram illustrating a method of managing a resource of a controlled device by transmitting an advertisement message according to an exemplary embodiment of the present invention.

FIG. 5 is a diagram illustrating a method of managing a resource of a controlled device by transmitting an advertisement message according to an exemplary embodiment of the present invention. In FIG. 5, one control point 100 and two controlled devices 210 and 220 are connected to each other. Unlike a method in which an action is directly invoked for a certain controlled device as described in FIG. 3, the current exemplary embodiment uses a method of multicasting a message in a network.

In operation 551, an advertisement message, representing that the control point 100 is connected to a network, is multicast. For example, when a predetermined time has elapsed after the control point 100 is connected to the network, and the controlled devices 210 and 220 still cannot determine whether the control point 100 is connected to the network or not, the control point 100 multicasts the advertisement message to the network so as to represent its availability. In order to represent that the control point 100 is still connected to the network, a message "M-alive" can be used. It will be obvious to one of ordinary skill in the art that the advertisement message can be embodied in a similar form to the "M-search" message under a UPnP environment.

In operation 552, the controlled devices 210 and 220 determine whether the control point 100 is connected to the network or not by receiving the advertisement message from the network. The connection can be determined according to the type of advertisement message. Next, in operation 553, information of an application corresponding to the control point 100 is updated. Operation 553 can be performed using a similar method to the method described in operation 358. The controlled devices 210 and 220 can discover an application corresponding to the control point 100 with reference to an address and identifier of the control point 100, which are included in the multicast advertisement message. Also, the application information including state information of the application can be managed in the same form as an information map.

In operation 554, the control point 100 multicasts the message representing that the control point 100 is separated from the network again. Similarly to operation 551, in order to represent that the control point 100 is separated from the network and the connection is terminated, a message "M-disconnect" can be used. It will be obvious to one of ordinary skill in the art that such an advertisement message can also be embodied in a similar form to the "M-search" message under a UPnP environment.

In operation 555, the controlled devices 210 and 220 determine whether the control point 100 is connected to the network or not by receiving the advertisement message from the network again, and the application information is updated in operation 556.

Figure 6:
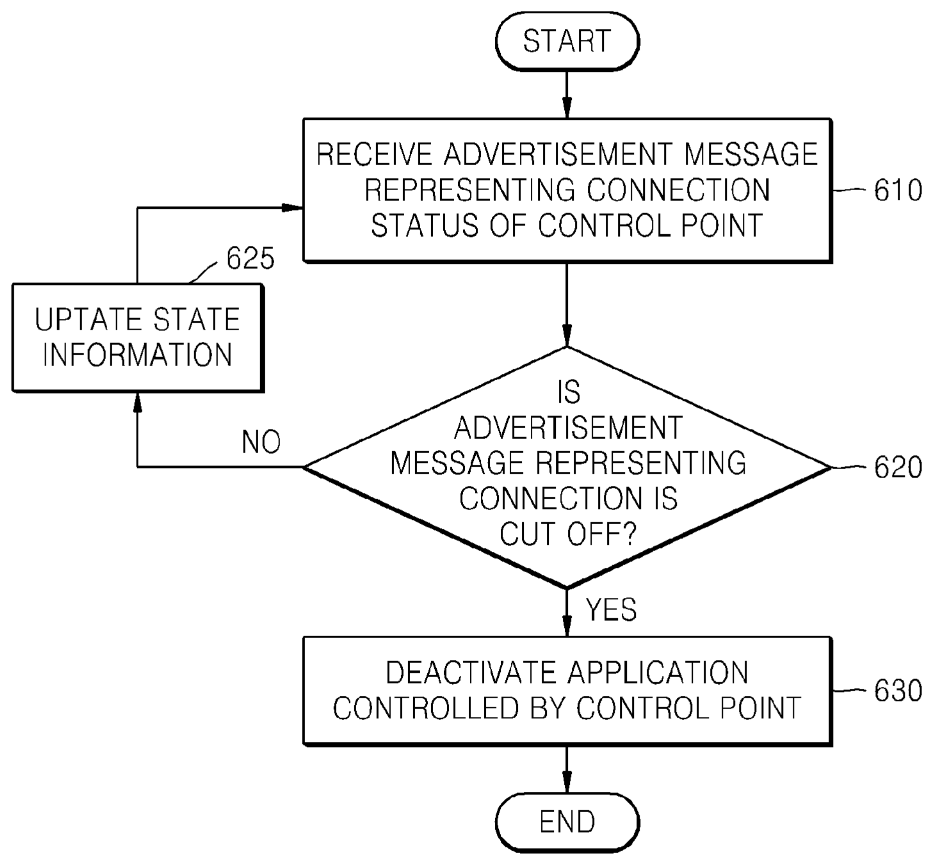
FIG. 6 is a flowchart illustrating processes for managing a resource of a controlled device by transmitting an advertisement message according to another exemplary embodiment of the present invention.

FIG. 6 is a flowchart illustrating processes for managing a resource of a controlled device by transmitting an advertisement message according to another exemplary embodiment of the present invention, and is an example of a process which is performed mainly on the controlled devices 210 and 220 of FIG. 5.

In operation 610, a message representing a connection status of a control point is received. As described above, the advertisement message is a message which the control point multicast to a network. In operation 620, in consideration of the type of received message, if the advertisement message is a message representing a non-connection of the control point, operation 630 is performed, and if not, operation 625 is performed.

In operation 625, information of an application corresponding to the control point is updated. Operation 625 corresponds to operation 553 of FIG. 5. If the application information is updated, a new waiting process is restarted as required, and thus, the process for managing a resource of the controlled device returns to operation 610. In other words, similarly to FIG. 4, as long as a connection between the control point and the controlled device is continuously maintained, a process in which operation 610, operation 620, and operation 625 are sequentially performed, and may be repeated.

Since operation 630 is performed when the advertisement message is a message representing a non-connection of the control point, an application controlled by the control point is deactivated. Operation 630 is the same as operation 430 of FIG. 4.

In FIGS. 5 and 6, a method of managing resources of a controlled device using an advertisement message has been described. According to the current exemplary embodiments, a control point represents a connection status of the control point to a network, so that a controlled device can determine that a connection between the controlled device and the control point is being maintained. Also, when the control point no longer exists in the network, an application corresponding to the control point is deactivated, and accordingly, resources of the controlled device can be effectively managed.

Figure 7:
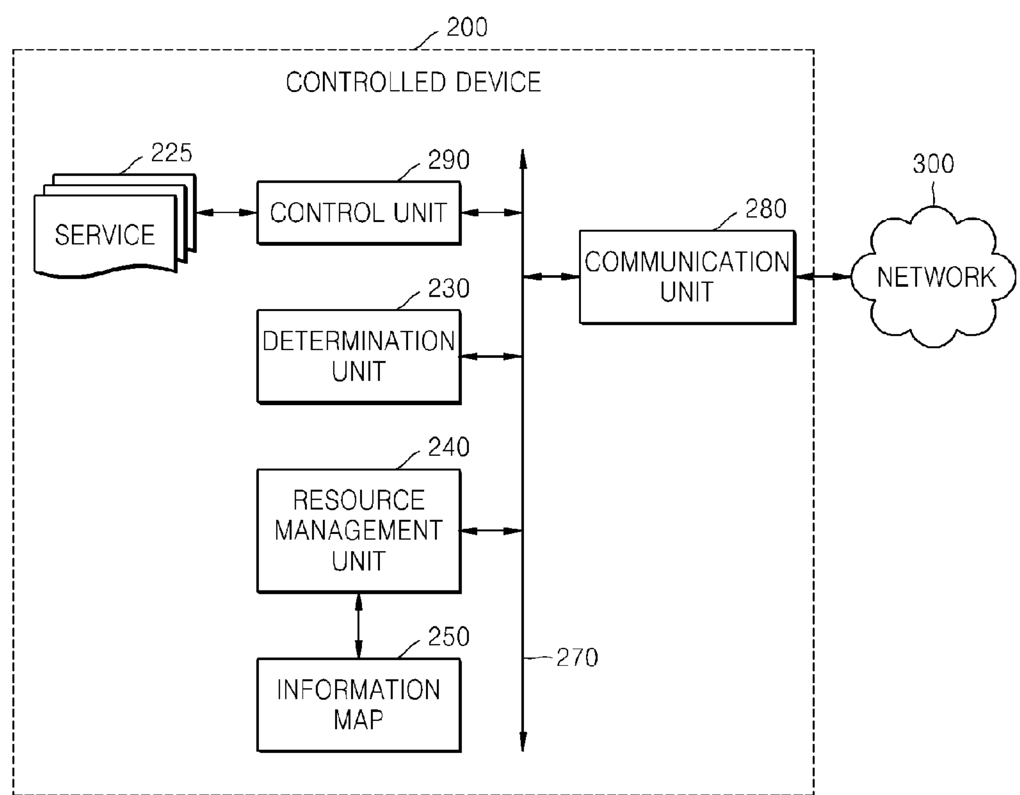
FIG. 7 is a block diagram illustrating an apparatus for managing a resource of a controlled device according to an exemplary embodiment of the present invention.

FIG. 7 is a block diagram illustrating an apparatus for managing a resource of a controlled device according to an exemplary embodiment of the present invention (the apparatus may be a controlled device 200 or an apparatus included in the controlled device 200). The apparatus includes a communication unit 280, a control unit 290, a determination unit 230, a resource management unit 240, an information map 250, and a bus 270 which communicably connects elements 280, 290, 230, 240, and 250.

The communication unit 280 communicating with a network 300 receives a command message (an invocation of an action) representing a connection of a control point (not shown) from the control point, or receives a message representing a connection status of the control point from the network 300. Since the network 300 uses a TCP/IP based communication protocol under a UPnP environment, the communication unit 280 must be able to perform conventional TCP/IP communication. Also, the communication unit 280 can use a conventional UPnP communication protocol, for example, a simple service discovery protocol (SSDP) for performing a discovery process, a generic event notification architecture (GENA) for executing an event, and a SOAP for transmitting a control message. The communication unit 280 can be embodied as a physical apparatus such as a conventional network interface controller (NIC).

The control unit 290 includes a timer so as to manage a connection status of a control point, for example, to wait for a predetermined time for an action to be invoked, or to regard the connection as being terminated when the predetermined time has elapsed, or to execute a service 225 corresponding to an invocation of an action. The control unit 290 can be embodied as part of an operation means such as a central processing unit (CPU) or a logic circuit of the controlled device 200.

The determination unit 230 determines whether a control point is connected or not by considering whether an action is invoked within a predetermined time. As a result of the above determination, if the connection is being maintained, the resource management unit 240 allows the control unit 290 to wait for the action to be invoked for a predetermined time, and if the connection has been terminated, an application corresponding to the control point is deactivated. Here, the information map 250 can be used to maintain application information.

Figure 8:
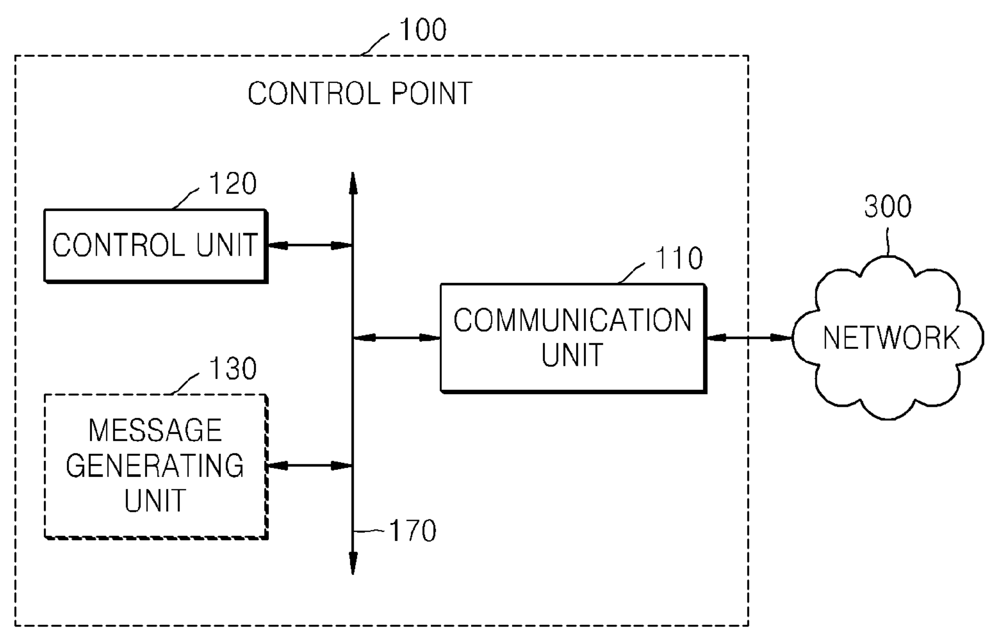
FIG. 8 is a block diagram illustrating an apparatus for representing the connection status of a control point according to an exemplary embodiment of the present invention.

FIG. 8 is a block diagram illustrating an apparatus for representing a connection status of a control point according to an exemplary embodiment of the present invention (the apparatus may be a controlled device 200 or an apparatus included in the controlled device 200). The apparatus includes a communication unit 110, a control unit 120, a message generating unit 130, and a bus 170 which communicably connects elements 110, 120, and 130.

The communication unit 110 transmits a command message (an action) for checking a connection of a control point 100 to a controlled device (not shown) or multicasts a message representing that the control point 100 is connected to a network 300 in the network 300. If the control point 100 is still connected to the network 300 after a predetermined time has elapsed, the communication unit 110 transmits the command message again. On the other hand, if the control point 100 is to be separated from the network 300, the communication unit 110 transmits a command message representing the connection is to be terminated before the control point 100 is separated from the network 300. Similarly to the communication unit 210 of FIG. 7, the communication unit 110 of FIG. 8 can use a UPnP conventional communication protocol such as a TCP/IP, an SSDP, a GENA, and an SOAP, and can be embodied as a physical apparatus such as a conventional NIC.

The control unit 120 includes a timer so as to control a command message or an advertisement message to be transmitted through the communication unit 110 at predetermined times. The control unit 120 can also be embodied as a part of an operation means such as a CPU or a logic circuit of the control point 100.

The message generating unit 130 generates the above command message or advertisement message, and can be embodied as a small-sized processor, a network controller, or the like. The message generating unit 130 is required to have a processing ability capable of generating and processing an appropriate message according to the type of message of the control point 100.

According to exemplary embodiments of the present invention, a controlled device continuously checks whether a control point is connected or not, or a control point represents a connection status of the control point to a network, so that a controlled device can determine whether a connection between the controlled device and the control point is being maintained. Also, when the control point does not exist in the network any more, an application corresponding to the control point is deactivated, and accordingly, resources of the controlled device can be effectively managed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing resources of a controlled device, the method comprising:

monitoring, by the controlled device, an invocation of an action representing a connection of a control point for a predetermined time;

determining whether the control point is connected to the controlled device based on whether the action is invoked; and increasing available resources by selectively deactivating an application which is controlled by the control point according to a result of the determining, wherein the action is invoked by the control point and includes a command message for executing a service in the controlled device, and wherein the action includes a specific identifier of the control point inputted as a parameter for determining whether the controlled device is connected to the control point.

2. The method of claim 1, wherein deactivating the application comprises one of removing the application, moving the application to a temporary storage space, or stopping an operation of the application.

3. The method of claim 1, wherein determining whether the control point is connected to the controlled device comprises determining that the connection is being maintained if the invocation of the action, for representing a connection of the control point, is received within the predetermined time, and then proceeding to an operation for monitoring the invocation of the action.

4. The method of claim 1, wherein determining whether the control point is connected to the controlled device comprises determining that the connection is terminated if the invocation of the action, for representing that the control point is being connected within the predetermined time, is not received or if an invocation of the action, for representing a non-connection of the control point, is received within the predetermined time.

5. The method of claim 1, wherein the control point and the controlled device comply with a Universal Plug and Play standard.

6. A non-transitory computer readable recording medium having recorded thereon a program for executing the method of claim 1.

7. A method of managing resources of a controlled device, the method comprising:

receiving an advertisement message representing a connection status of a control point;

determining whether the control point is connected to the controlled device based on a type of the received advertisement message; and increasing available resources by selectively deactivating an application which is controlled by the control point according to a result of the determining, wherein the advertisement message includes an address and identifier of the control point, and wherein the controlled device discovers an application corresponding to the control point based on the address and the identifier of the control point and updates information of the application corresponding to the control point.

8. The method of claim 7, wherein deactivating the application comprises one of removing the application, moving the application to a temporary storage space, or stopping operation of the application.

9. The method of claim 7, wherein determining whether the control point is connected to the controlled device comprises determining that the connection is being maintained if an advertisement message representing that the control point is connected is received.

10. The method of claim 7, wherein determining whether the control point is connected to the controlled device comprises determining the connection is terminated when an advertisement message representing that the control point is separated from a network is received.

11. The method of claim 7, wherein the control point and the controlled device comply with a Universal Plug and Play standard.

12. A non-transitory computer readable recording medium having recorded thereon a program for executing the method of claim 7.

13. A method of representing a connection of a control point, the method comprising:

invoking an action for representing a connection of the control point to a controlled device at predetermined times; and invoking, by the control point, an action representing that the connection is selectively terminated according to whether the connection is maintained, wherein the action includes a command message for executing a service in the controlled device, and wherein the action includes a specific identifier of the control point inputted as a parameter for determining whether the controlled device is connected to the control point.

14. The method of claim 13, wherein the controlled device and the control point comply with a Universal Plug and Play standard.

15. A non-transitory computer readable recording medium having recorded thereon a program for executing the method of claim 13.

16. A method of representing a connection of a control point, the method comprising:

multicasting to the network a message representing that a control point is connected to a network; and selectively multicasting to the network a message representing that the connection is terminated according to whether the connection is maintained after a predetermined time has elapsed, wherein the multicasting message representing that the control point is connected to the network includes an address and identifier of the control point, and wherein a controlled device in the network discovers an application corresponding to the control point based on the address and the identifier of the control point and updates information of the application corresponding to the control point.

17. The method of claim 16, wherein the control point complies with a Universal Plug and Play standard.

18. A non-transitory computer readable recording medium having recorded thereon a program for executing the method of claim 16.

* * * * *